(12) United States Patent
Morita et al.

(10) Patent No.: US 11,934,053 B2
(45) Date of Patent: Mar. 19, 2024

(54) IMAGING APPARATUS

(71) Applicant: Panasonic Intellectual Property Management Co., Ltd., Osaka (JP)

(72) Inventors: Shuji Morita, Kyoto (JP); Masaya Takahashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 18/087,866

(22) Filed: Dec. 23, 2022

(65) Prior Publication Data

US 2023/0280608 A1 Sep. 7, 2023

(30) Foreign Application Priority Data

Feb. 1, 2022 (JP) ................................. 2022-014356

(51) Int. Cl.
    *G02F 1/133* (2006.01)
    *G01N 21/59* (2006.01)
    *H04N 23/75* (2023.01)

(52) U.S. Cl.
    CPC ......... *G02F 1/13318* (2013.01); *G01N 21/59* (2013.01); *H04N 23/75* (2023.01); *G01N 2201/1211* (2013.01); *G02F 2203/48* (2013.01)

(58) Field of Classification Search
    CPC . G02F 1/13318; G02F 2203/48; G01N 21/59; H04N 23/75
    USPC ............................................ 349/61, 72, 199
    See application file for complete search history.

(56) References Cited

U.S. PATENT DOCUMENTS

| 2008/0309611 A1* | 12/2008 | Yang ..................... G09G 3/3426 349/116 |
| 2017/0108725 A1* | 4/2017 | Morita .................... G03B 17/00 |
| 2022/0172687 A1* | 6/2022 | Li ............................ G09G 3/36 |

FOREIGN PATENT DOCUMENTS

WO     2015/151579 A1    10/2015

* cited by examiner

*Primary Examiner* — Charles S Chang
(74) *Attorney, Agent, or Firm* — Renner, Otto, Boisselle & Sklar, LLP

(57) ABSTRACT

An imaging apparatus of the present disclosure includes: a liquid crystal panel configured to adjust light transmittance; a light emitting element configured to apply detection light; a first light receiving element configured to receive first detection light transmitted through the liquid crystal panel in the detection light, and to output a first output value related to a light amount of the first detection light; a second light receiving element configured to receive second detection light not transmitted through the liquid crystal panel in the detection light, and to output a second output value related to a light amount of the second detection light; a transmittance calculator configured to calculate a liquid crystal transmittance of the liquid crystal panel based on the first output value and the second output value; and an imaging element configured to image imaging light transmitted through the liquid crystal panel.

12 Claims, 13 Drawing Sheets

IMAGING APPARATUS

BACKGROUND OF THE INVENTION

Field of the Invention

The present disclosure relates to an imaging apparatus.

Description of the Related Art

For example, WO/2015/151579 discloses a dimming module including a liquid crystal layer provided between a pair of electrodes and a transmittance sensor that detects light transmittance of the liquid crystal layer, and an imaging apparatus including the dimming module.

SUMMARY

However, in the imaging apparatus described in WO/2015/151579, in some cases, more accurate liquid crystal transmittance cannot be calculated.

Thus, an object of the present disclosure is to provide an imaging apparatus that calculates more accurate liquid crystal transmittance.

In order to solve the above problem, an imaging apparatus according to an aspect of the present disclosure includes:
  a liquid crystal panel configured to adjust light transmittance;
  a light emitting element configured to apply detection light;
  a first light receiving element configured to receive first detection light transmitted through the liquid crystal panel in the detection light, and to output a first output value related to a light amount of the first detection light;
  a second light receiving element configured to receive second detection light not transmitted through the liquid crystal panel in the detection light, and to output a second output value related to a light amount of the second detection light;
  a transmittance calculator configured to calculate a liquid crystal transmittance of the liquid crystal panel based on the first output value and the second output value; and
  an imaging element configured to image imaging light transmitted through the liquid crystal panel.

According to the present disclosure, it is possible to provide an imaging apparatus that calculates more accurate liquid crystal transmittance.

DETAILED DESCRIPTION

Background Leading to Present Disclosure

In the imaging apparatus described in WO/2015/151579, the signal output from the transmittance sensor varies depending on the temperature. For example, when the temperature of the transmittance sensor increases, the current value output from the transmittance sensor increases. For this reason, in the imaging apparatus described in WO/2015/151579, by providing a temperature sensor near the transmittance sensor, the signal fluctuation due to the temperature change of the transmittance sensor is corrected.

However, when the temperature sensor is used, there is a problem that it is not possible to correct a characteristic change due to aged deterioration of the light emitting element and the light receiving element used for the transmittance sensor. The light emitting element and the light receiving element may decrease in output due to aged deterioration. Since the imaging apparatus described in WO/2015/151579 does not have a configuration to detect a characteristic change due to aged deterioration, it is not possible to calculate an accurate liquid crystal transmittance when aged deterioration occurs.

Thus, the present inventor(s) has (have) studied a configuration for calculating more accurate liquid crystal transmittance, and have reached the following disclosure.

Hereinafter, an imaging apparatus including a dimming module according to embodiments of the present disclosure will be described with reference to the drawings.

First Embodiment

Figure 1:
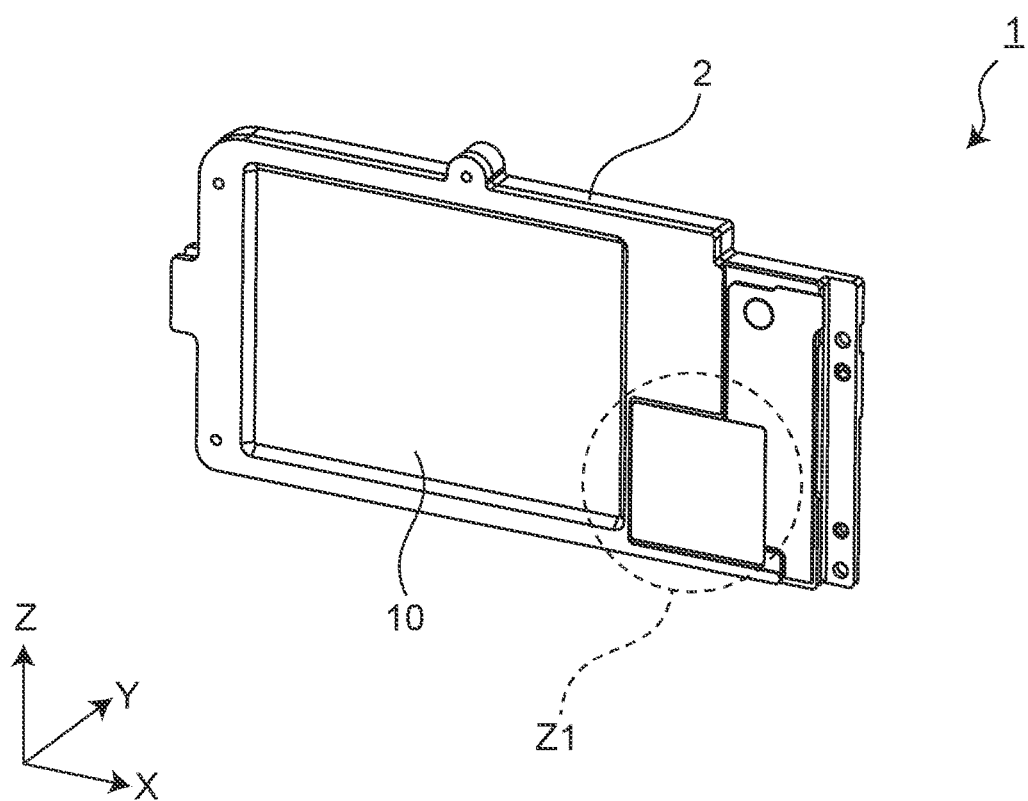
FIG. 1 is a schematic perspective view of a dimming module according to a first embodiment of the present disclosure.
Figure 2:
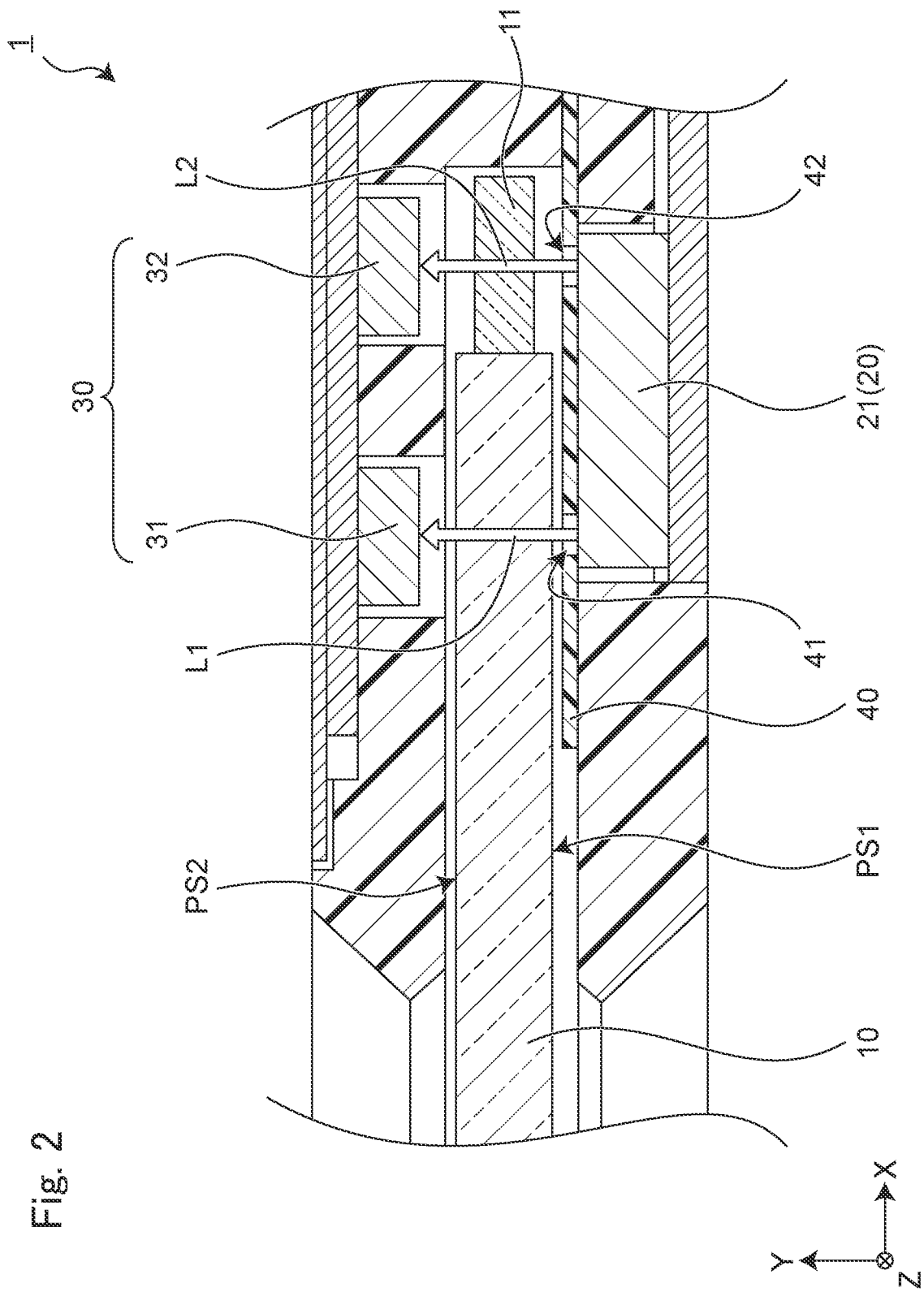
FIG. 2 is a schematic cross-sectional view of a Z1 portion of the dimming module shown in FIG. 1.
Figure 3:
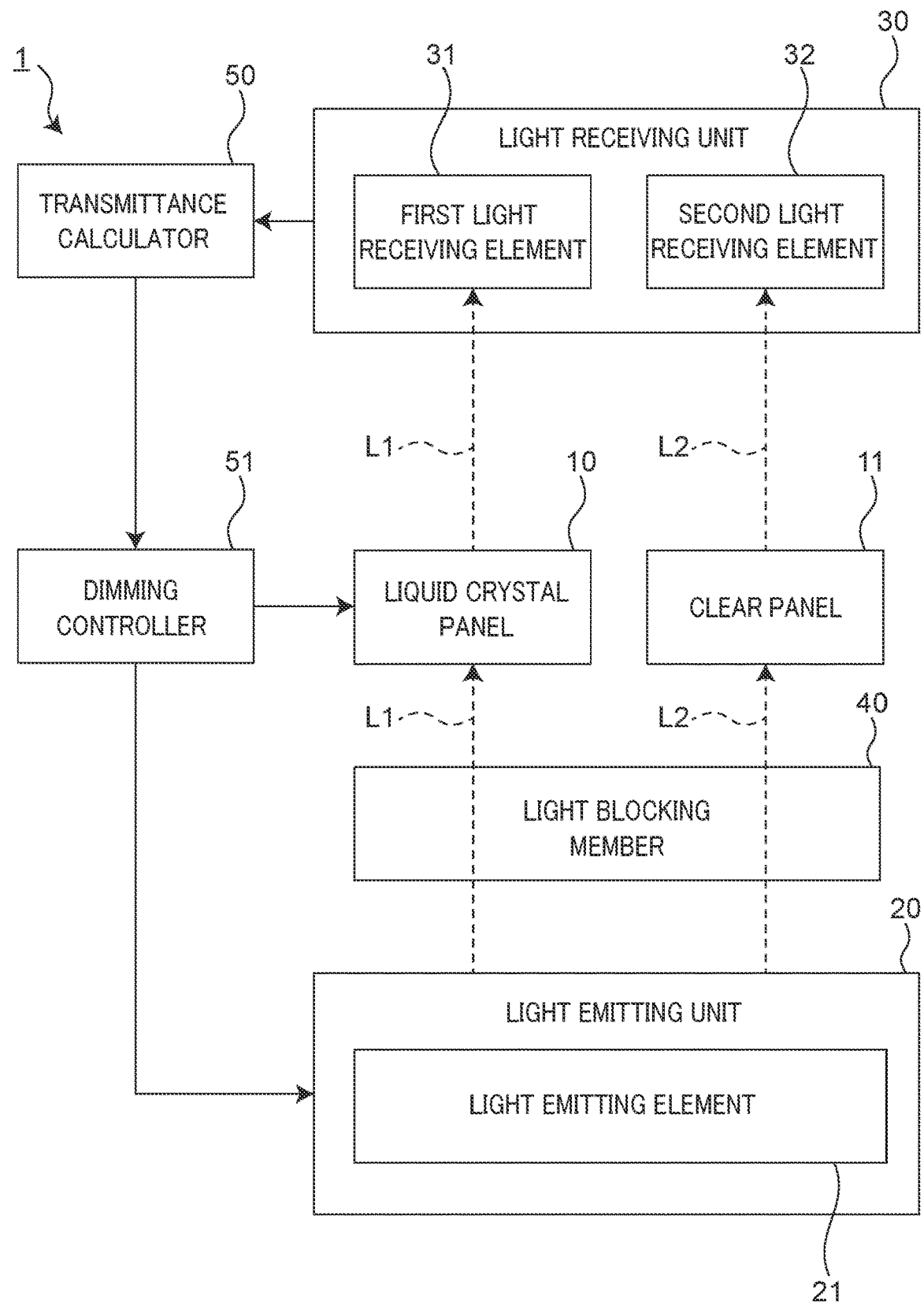
FIG. 3 is a block diagram showing a schematic configuration of the dimming module.

A dimming module according to a first embodiment of the present disclosure will be described with reference to FIGS. 1 to 3. FIG. 1 is a schematic perspective view of a dimming module according to the first embodiment of the present disclosure. FIG. 2 is a schematic cross-sectional view of a Z1 portion of the dimming module shown in FIG. 1. FIG. 3 is a block diagram showing a schematic configuration of the dimming module.

It should be noted that the X-Y-Z coordinate system shown in the drawings is for facilitating understanding of the present disclosure, and does not limit the present disclosure. The X-axis direction indicates the left-right direction of the dimming module 1, the Y-axis indicates the front-rear direction, and the Z-axis direction indicates the up-down direction. In addition, in the present specification, a side on which light is incident on the dimming module 1 is referred to as a "front side", and a side opposite to the side on which light is incident on the dimming module 1 is referred to as a "rear side".

The dimming module 1 is a module that adjusts the amount of light incident on the liquid crystal panel 10 by electrically controlling the liquid crystal panel 10. For example, the dimming module 1 is used as an ND filter of an imaging apparatus such as a camera. When the dimming module 1 is used as an ND filter, the dimming module 1 is arranged between a lens and an imaging element in an imaging apparatus. In this case, the front side of the dimming module corresponds to the side where the lens is present, and the rear side of the dimming module corresponds to the side where the imaging element is present.

[Configuration of Dimming Module]

As shown in FIGS. 1 to 3, the dimming module 1 according to the present first embodiment includes a liquid crystal panel 10, a light emitting unit 20, a light receiving unit 30, and a light blocking member 40. In addition, the dimming module 1 includes a transmittance calculator 50 and a dimming controller 51 as functional configurations. These elements constituting the dimming module 1 are stored in the casing 2. It should be noted that the light emitting unit 20, the light receiving unit 30, and the light blocking member 40 are disposed in a Z1 portion shown in FIG. 1.

<Liquid Crystal Panel>

The liquid crystal panel 10 is a panel that adjusts transmittance of incident light. Specifically, the liquid crystal panel 10 has a plate shape having a first surface PS1 and a second surface PS2 opposed to the first surface PS1. The first surface PS1 is a surface positioned on the front side of the dimming module 1, and is a surface on the side on which light is incident in the liquid crystal panel 10. The second surface PS2 is a surface positioned on the rear side of the dimming module 1, and is a surface on the side through which light is transmitted in the liquid crystal panel 10.

The liquid crystal panel 10 has a laminated structure in which a plurality of glass substrates and one or a plurality of liquid crystal layers are laminated. The glass substrate is a substrate formed of transparent glass and has a flat plate shape. The liquid crystal layer contains liquid crystal molecules. The liquid crystal molecule is, for example, a molecule having a rod shape having a major axis direction and a minor axis direction and having an orientation changed when a voltage is applied. The liquid crystal molecule changes in the optical properties depending on its orientation.

In the liquid crystal panel 10, a liquid crystal layer is sandwiched between a plurality of glass substrates, each of the two glass substrates in the outermost layers is provided with a transparent electrode, and the orientation of liquid crystal molecules in the liquid crystal layer is changed by applying a voltage to the transparent electrodes. Accordingly, the transmittance of the light incident on the liquid crystal panel 10 can be adjusted. In the present embodiment, by applying a voltage to the transparent electrode, the liquid crystal panel 10 has the major axis direction of the liquid crystal molecules changed to a direction parallel to the glass substrate. Therefore, the larger the voltage applied to the transparent electrode, the smaller the transmittance of the liquid crystal panel 10, and the smaller the voltage applied to the transparent electrode, the larger the transmittance of the liquid crystal panel 10. For example, the liquid crystal panel 10 is an electronic ND filter.

The liquid crystal panel 10 is provided with a clear panel 11. The clear panel 11 is formed of, for example, a part of a glass substrate constituting the liquid crystal panel 10. The clear panel 11 is provided on the outer periphery of the liquid crystal panel 10.

The liquid crystal panel 10 is stored in a frame-shaped casing 2, and an outer peripheral portion of the liquid crystal panel 10, that is, the clear panel 11 is supported by the casing 2. Therefore, the first surface PS1 of the liquid crystal panel 10 is exposed from the casing 2 on the front side of the dimming module 1, and the second surface PS2 of the liquid crystal panel 10 is exposed from the casing 2 on the rear side of the dimming module 1.

<Light Emitting Unit>

The light emitting unit 20 is a unit that applies detection light. The light emitting unit 20 includes a light emitting element 21. As the light emitting element 21, for example, a light emitting diode (LED) or the like can be used. The detection light is light used for detecting the transmittance of the liquid crystal panel 10. The light emitting element 21 applies, for example, visible light as the detection light. The visible light is, for example, light having a wavelength of 350 nm or more and 600 nm or less.

The light emitting unit 20 includes a light emitting element 21 that applies the first detection light L1 and the second detection light L2.

The light emitting unit 20 is disposed on the first surface PS1 side of the liquid crystal panel 10. The light emitting element 21 applies the first detection light L1 toward the first surface PS1 of liquid crystal panel 10. The first detection light L1 is transmitted through the liquid crystal panel 10 from the first surface PS1 toward the second surface PS2 of the liquid crystal panel 10, and is incident on a first light receiving element 31 of the light receiving unit 30 described below. In addition, the light emitting element 21 applies the second detection light L2 toward the clear panel 11 provided on the outer periphery of the liquid crystal panel 10. The second detection light L2 is transmitted through the clear panel 11 and is incident on a second light receiving element 32 of the light receiving unit 30 described below. In the present embodiment, the first detection light L1 and the second detection light L2 are incident on the light receiving unit 30 passing through openings 41 and 42 provided in the light blocking member 40 described below.

<Light Receiving Unit>

The light receiving unit 30 is a unit that receives light applied from the light emitting unit 20. The light receiving unit 30 includes a first light receiving element 31 and a second light receiving element 32. As the first light receiving element 31 and the second light receiving element 32, for example, a photodiode, a phototransistor, or the like can be used.

The first light receiving element 31 receives the first detection light L1 transmitted through the liquid crystal panel 10 in the detection light applied from the light emitting unit 20. The first light receiving element 31 outputs a first output value related to the light amount of the first detection light L1. The second light receiving element 32 receives the second detection light L2 not transmitted through the liquid crystal panel 10 in the detection light applied from the light emitting unit 20. That is, the second light receiving element 32 receives the second detection light L2 transmitted through the clear panel 11. The second light receiving element 32 outputs a second output value related to the light amount of the second detection light L2. In addition, the first output value and the second output value are voltage values. It should be noted that the first output value and the second output value may be current values.

The first light receiving element 31 and the second light receiving element 32 have substantially the same temperature characteristic. In the present specification, "substantially" may mean an error within 5%. Preferably, "substantially" may mean an error within 2%. More preferably, "substantially" may mean an error within 1%.

The light receiving unit 30 is disposed on the second surface PS2 side of the liquid crystal panel 10. The first detection light L1 is transmitted through the liquid crystal panel 10 from the first surface PS1 toward the second surface PS2 of the liquid crystal panel 10, and is incident on the first light receiving element 31.

<Light Blocking Member>

The light blocking member 40 is a member that blocks leakage light applied from the light emitting unit 20. As viewed from the main surface side of the liquid crystal panel 10 on which light is incident, the light blocking member 40 is provided with openings 41 and 42 at portions overlapping the first light receiving element 31 and the second light receiving element 32. The main surface side of the liquid crystal panel 10 on which light is incident means a direction from the first surface PS1 toward the second surface PS2 of the liquid crystal panel 10 (Y direction). In the present embodiment, the light blocking member 40 is formed of, for example, a plate-shaped member. In addition, the light blocking member 40 is disposed on the first surface PS1 side of the liquid crystal panel 10.

The first detection light L1 applied from the light emitting unit 20 passes through the opening 41 of the light blocking member 40 and is incident on the first light receiving element 31. In addition, the second detection light L2 applied from the light emitting unit 20 passes through the opening 42 of the light blocking member 40 and is incident on the second light receiving element 32. On the other hand, leakage light stemming from the light emitting unit 20 is blocked by the light blocking member 40.

Next, as a functional configuration of the dimming module 1, the transmittance calculator 50 and the dimming controller 51 will be described.

<Transmittance Calculator>

The transmittance calculator 50 calculates the liquid crystal transmittance Q of the liquid crystal panel 10 based on the first output value output from the first light receiving element 31 and the second output value output from the second light receiving element 32. The first output value relates to the light amount of the first detection light L1 transmitted through the liquid crystal panel 10, and the second output value relates to the light amount of the second detection light L2 not transmitted through the liquid crystal panel 10 but transmitted through the clear panel 11. The liquid crystal transmittance Q is transmittance of the liquid crystal panel 10 calculated based on the first output value and the second output value. For example, the transmittance calculator 50 changes the first output value based on the second output value, and calculates the liquid crystal transmittance Q based on the changed first output value.

In the first light receiving element 31 and the second light receiving element 32, the output value fluctuates due to a temperature change. Therefore, even when the transmittance of the liquid crystal panel 10 does not actually change, the first output value and the second output value change when the temperature changes.

The transmittance calculator 50 changes the first output value based on the change in the second output value due to the temperature change, and calculates the liquid crystal transmittance Q of the liquid crystal panel 10 based on the changed first output value. Accordingly, the transmittance calculator 50 can calculate the liquid crystal transmittance Q by correcting the change in the output value due to the change in the temperature characteristic of the light receiving element without using a temperature sensor.

<Dimming Controller>

The dimming controller 51 controls the transmittance of the liquid crystal panel 10 based on the liquid crystal transmittance Q calculated by the transmittance calculator 50. For example, the dimming controller 51 controls the transmittance of the liquid crystal panel 10 based on the set target transmittance and the liquid crystal transmittance Q. The target transmittance may be a value selected from among a plurality of preset setting values, or may be a value selected from within a range of predetermined numerical values. For example, when the setting of the transmittance of the liquid crystal panel 10 can be changed in the range of 1% or more and 25% or less, the target transmittance may be a value selected from within a range of 1% or more and 25% or less. The target transmittance may be set by a user or may be automatically set according to a predetermined condition.

The dimming controller 51 compares the target transmittance with the liquid crystal transmittance Q, and controls the transmittance of the liquid crystal panel 10 so that the liquid crystal transmittance Q is equal to the target transmittance. In the present embodiment, the dimming controller 51 controls the transmittance of the liquid crystal panel 10 by controlling the voltage applied to the liquid crystal panel 10. For example, the dimming controller 51 decreases the voltage applied to the liquid crystal panel 10 when it is desired to increase the transmittance, and increases the voltage applied to the liquid crystal panel 10 when it is desired to decrease the transmittance.

The transmittance calculator 50 and the dimming controller 51 can be implemented by an electronic circuit. The transmittance calculator 50 and the dimming controller 51 can include, for example, a microcomputer, a CPU, an MPU, a GPU, a DSP, an FPGA, or an ASIC. The functions of the transmittance calculator 50 and the dimming controller 51 may be configured only by hardware, or may be implemented by combining hardware and software. The transmittance calculator 50 and the dimming controller 51 implement predetermined functions by reading data and programs stored in a storage such as a memory and performing various pieces of arithmetic processing.

[Imaging Apparatus]

Figure 4:
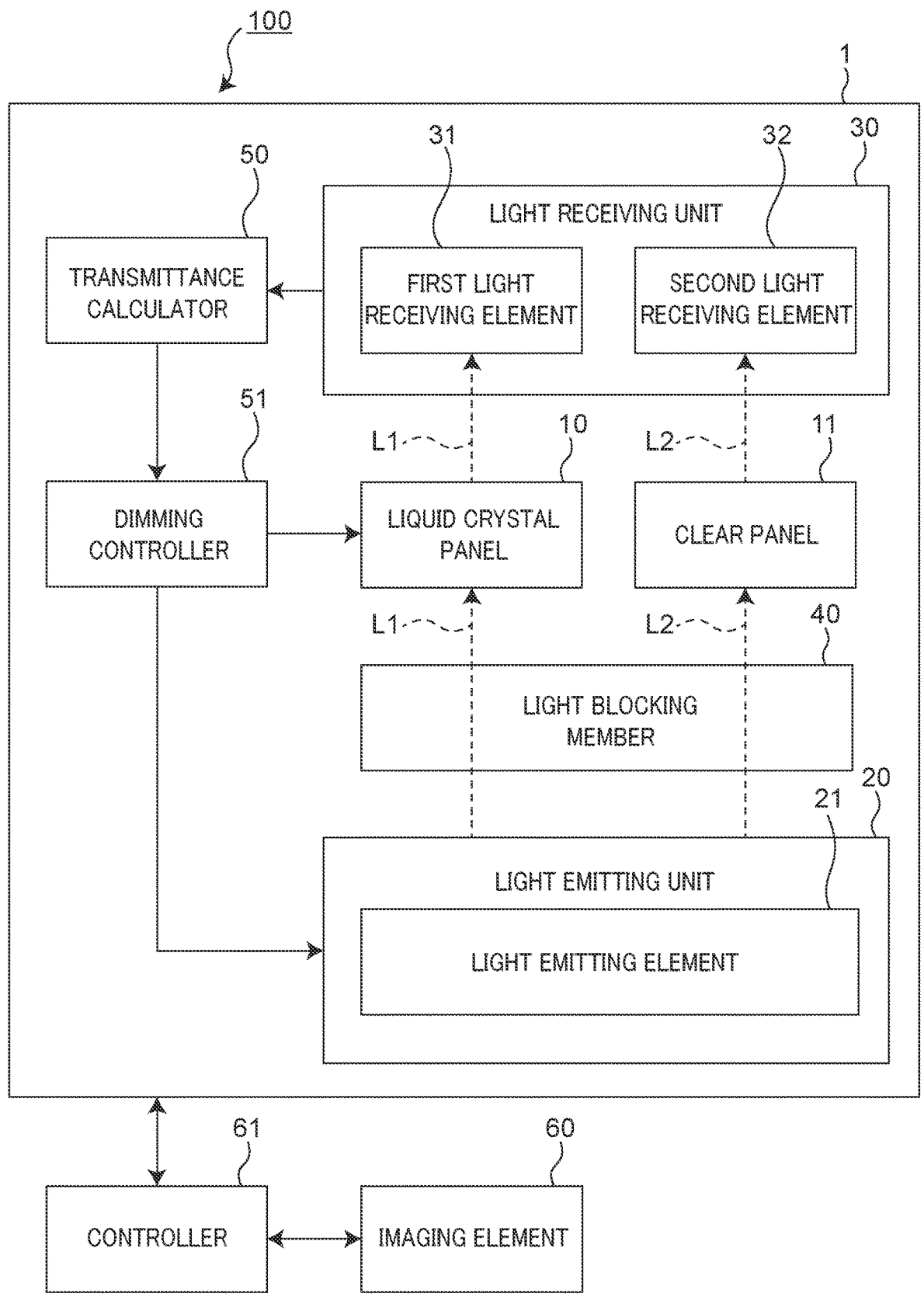
FIG. 4 is a block diagram showing a schematic configuration of an imaging apparatus including the dimming module according to the first embodiment of the present disclosure.
Figure 5:
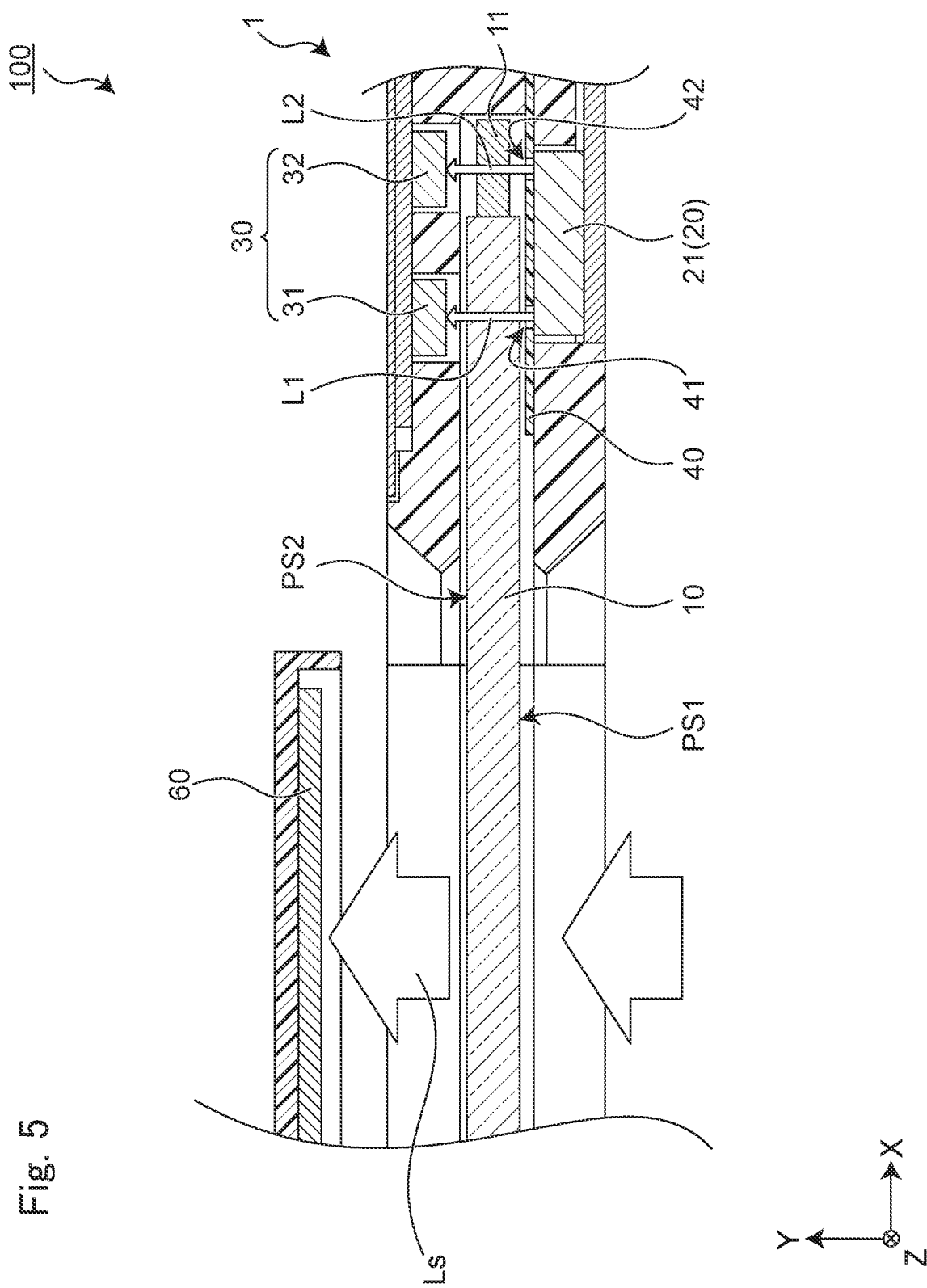
FIG. 5 is a schematic partial cross-sectional view of the imaging apparatus.

An imaging apparatus including the dimming module 1 according to the first embodiment will be described with reference to FIGS. 4 and 5. FIG. 4 is a block diagram showing a schematic configuration of an imaging apparatus including the dimming module according to the first embodiment of the present disclosure. FIG. 5 is a schematic partial cross-sectional view of the imaging apparatus. It should be noted that FIG. 5 shows a cross section of a portion where the dimming module 1 is disposed in the imaging apparatus 100.

As shown in FIGS. 4 and 5, the imaging apparatus 100 includes a dimming module 1, an imaging element 60, and a controller 61, and configurations of an image processing engine, a display monitor, an operation unit, a memory card slot, and the like are omitted for simplification.

<Imaging Element>

The imaging element 60 is an element that images the imaging light Ls. Specifically, the imaging element 60 is an element that detects the imaging light Ls transmitted through the dimming module 1 to be incident and acquires an imaging signal. The imaging element 60 is, for example, an image sensor such as a CCD or a CMOS.

The imaging element 60 is disposed on the rear side of the dimming module 1, that is, on the second surface PS2 side of the dimming module 1. The imaging element 60 detects the imaging light Ls transmitted through the liquid crystal panel 10 from the first surface PS1 toward the second surface PS2 of the liquid crystal panel 10.

<Controller>

The controller 61 comprehensively controls the components of the imaging apparatus 100. Specifically, the controller 61 controls the dimming module 1 and the imaging element 60. The controller 61 can be implemented by an electronic circuit. The controller 61 can include, for example, a microcomputer, a CPU, an MPU, a GPU, a DSP, an FPGA, or an ASIC. The function of the controller 61 may be configured only by hardware, or may be implemented by combining hardware and software. By reading data and programs stored in the storage section such as a memory and performing various pieces of arithmetic processing, the controller 61 implements a predetermined function.

[Example of Liquid Crystal Transmittance Calculation]

Figure 6:
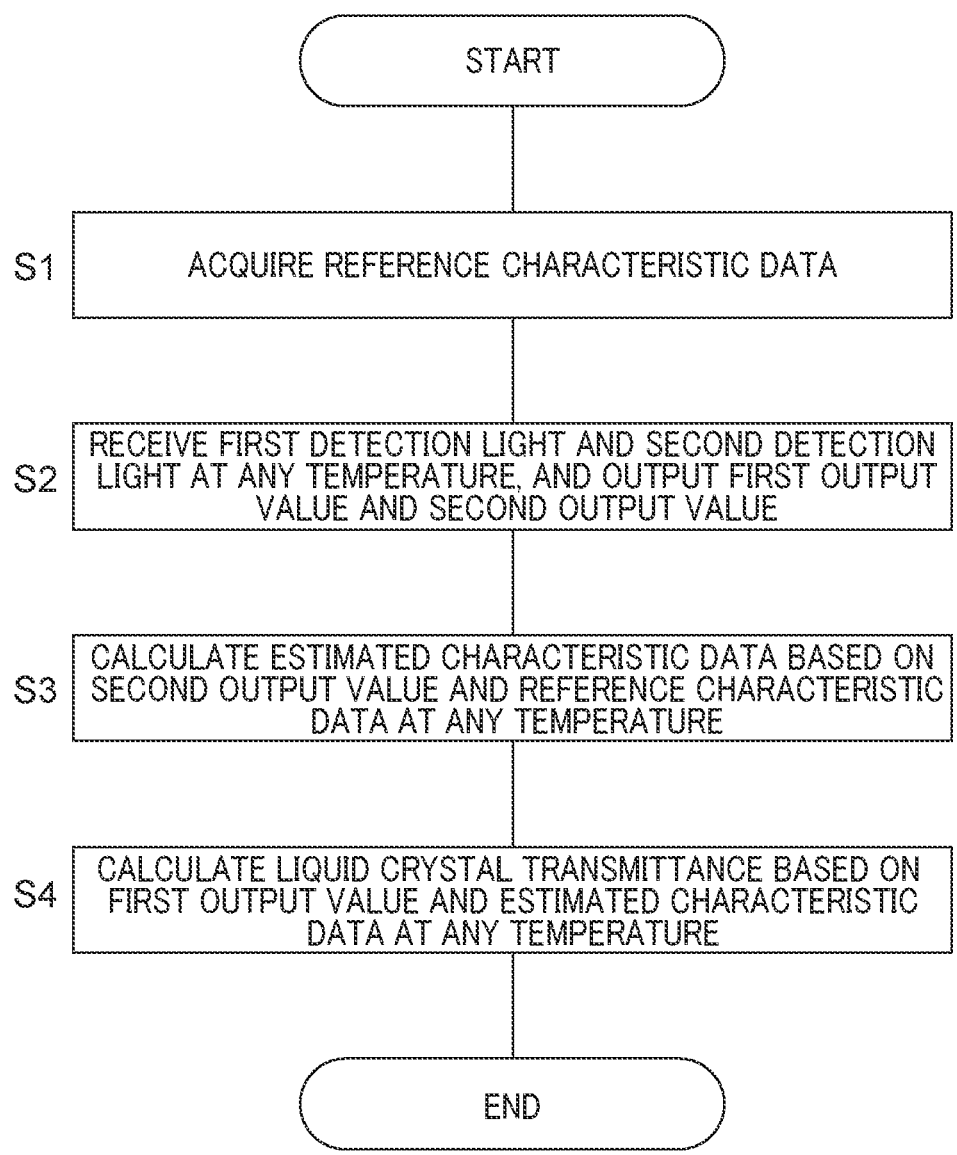
FIG. 6 is a flowchart of calculation of liquid crystal transmittance in the first embodiment of the present disclosure.

With reference to FIG. 6, an example of processing of calculating the liquid crystal transmittance by correcting the change due to the temperature characteristic of the light receiving element without using a temperature sensor will be described. FIG. 6 is a flowchart of liquid crystal transmittance calculation.

As shown in FIG. 6, in step S1, the transmittance calculator 50 acquires reference characteristic data. The reference characteristic data indicates the relationship between the output value of the light receiving element and the transmittance at the reference temperature $T_0$. The reference temperature $T_0$ indicates a temperature serving as a reference for changing the output value.

Figure 7:
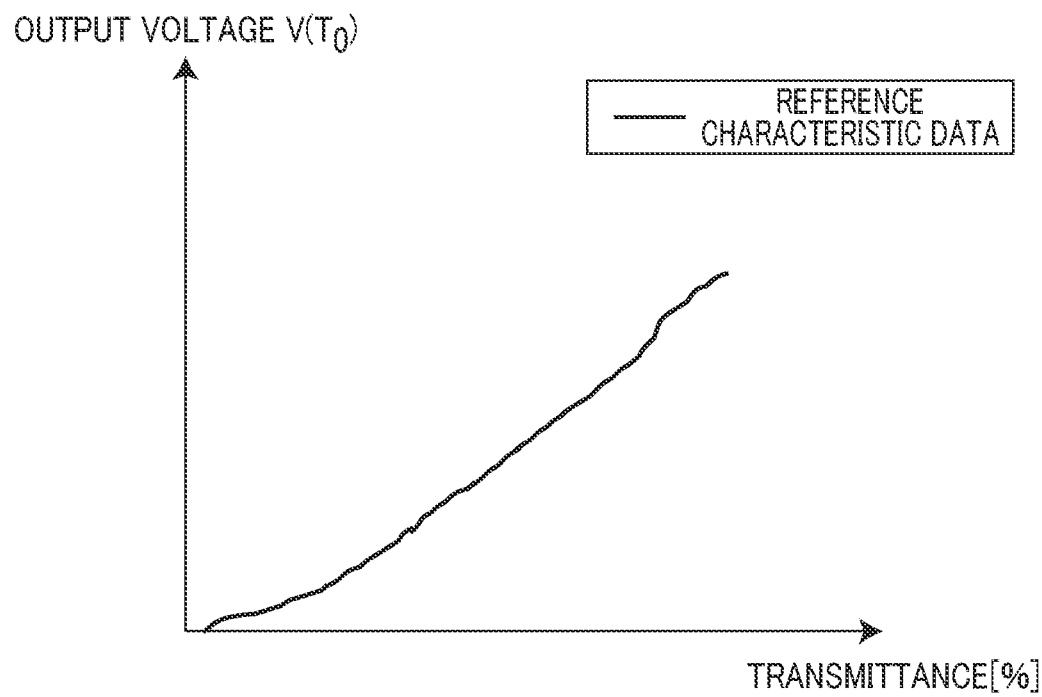
FIG. 7 is a schematic diagram for illustrating an example of reference characteristic data.

FIG. 7 is a schematic diagram for illustrating an example of the reference characteristic data. As shown in FIG. 7, the reference characteristic data is a graph indicating a relationship between the voltage value (output voltage) output from the light receiving element and the transmittance at the reference temperature $T_0$. In the present embodiment, the reference characteristic data indicates the relationship between the second output value $V_2(T_0)$ of the second light receiving element 32 and the transmittance at the reference temperature $T_0$. It should be noted that the light receiving element of the reference characteristic data may be a light receiving element having substantially the same characteristic as the first light receiving element 31 or the second light receiving element 32.

For example, the reference characteristic data indicates a relationship in which the output voltage and the transmittance are proportional at the reference temperature $T_0$. In the reference characteristic data, the larger the output voltage at the reference temperature $T_0$, the larger the transmittance.

The reference characteristic data is stored in, for example, the storage of the dimming module 1. The transmittance calculator 50 reads the reference characteristic data from the storage.

Returning to FIG. 6, in step S2, the first light receiving element 31 and the second light receiving element 32 respectively receive the first detection light L1 and the second detection light L2 at any temperature $T_1$. Accordingly, the first light receiving element 31 outputs the first voltage value $V_1(T_1)$ as the first output value related to the light amount of the first detection light L1, and the second light receiving element 32 outputs the second voltage value $V_2(T_1)$ as the second output value related to the light amount of the second detection light L2.

In step S3, the transmittance calculator 50 calculates the estimated characteristic data based on the second output value $V_2(T_1)$ and the reference characteristic data at any temperature $T_1$. The estimated characteristic data indicates the relationship between the output value of the light receiving element and the transmittance at any temperature $T_1$. In the present embodiment, the estimated characteristic data indicates the relationship between the second output value $V_2(T_1)$ of the second light receiving element 32 and the transmittance at any temperature $T_1$. It should be noted that the light receiving element of the estimated characteristic data is not limited to the second light receiving element 32. For example, the light receiving element of the estimated characteristic data may be a light receiving element having substantially the same characteristic as the first light receiving element 31 or the second light receiving element 32.

Figure 8:
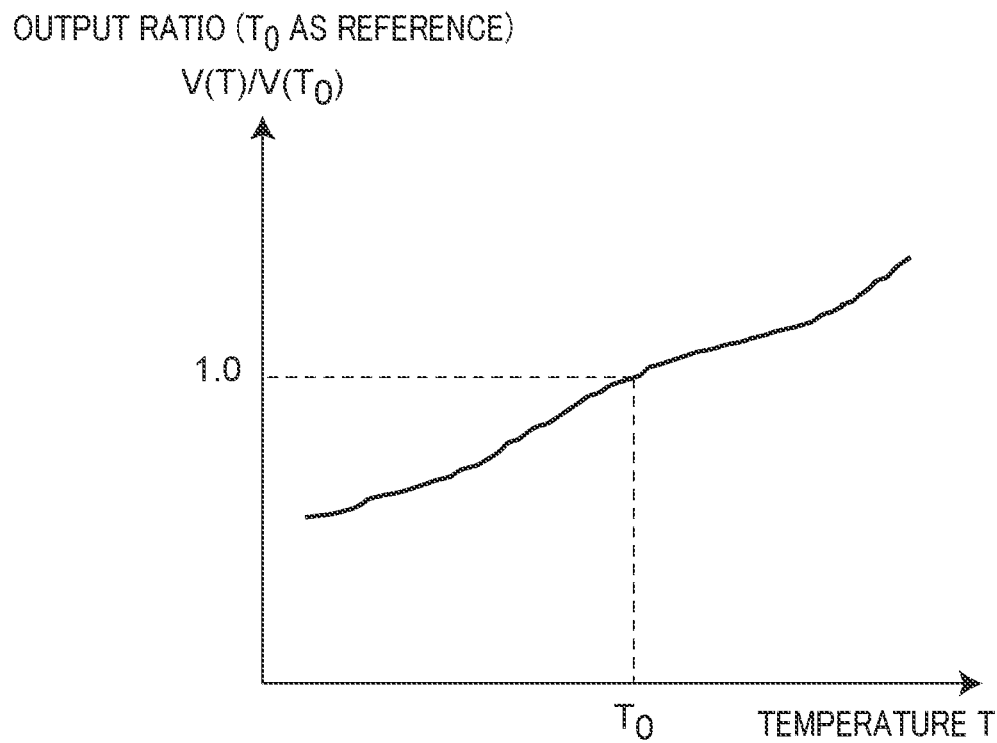
FIG. 8 is a schematic diagram for illustrating an example of a temperature characteristic of a light receiving element.

FIG. 8 is a schematic diagram for illustrating an example of a temperature characteristic of the light receiving element. The graph shown in FIG. 8 shows temperature characteristics of the first light receiving element 31 and the second light receiving element 32. As shown in FIG. 8, the first light receiving element 31 and the second light receiving element 32 have substantially the same temperature characteristics. Therefore, the output values of the first light receiving element 31 and the second light receiving element 32 change in the same manner as the temperature changes. That is, the output values of the first light receiving element 31 and the second light receiving element 32 change at substantially the same ratio to the reference characteristic data.

The transmittance calculator 50 calculates the estimated characteristic data from the ratio $V_2(T_1)/V_2(T_0)$ between the second output value $V_2(T_1)$ at any temperature $T_1$ and the reference output value $V_2(T_0)$ at the reference temperature $T_0$. The reference output value $V_2(T_0)$ is an output value of the light receiving element whose transmittance is 100% at the reference temperature $T_0$. Specifically, the transmittance calculator 50 calculates the estimated characteristic data by converting the reference characteristic data with the ratio $V_2(T_1)/V_2(T_0)$.

Figure 9:
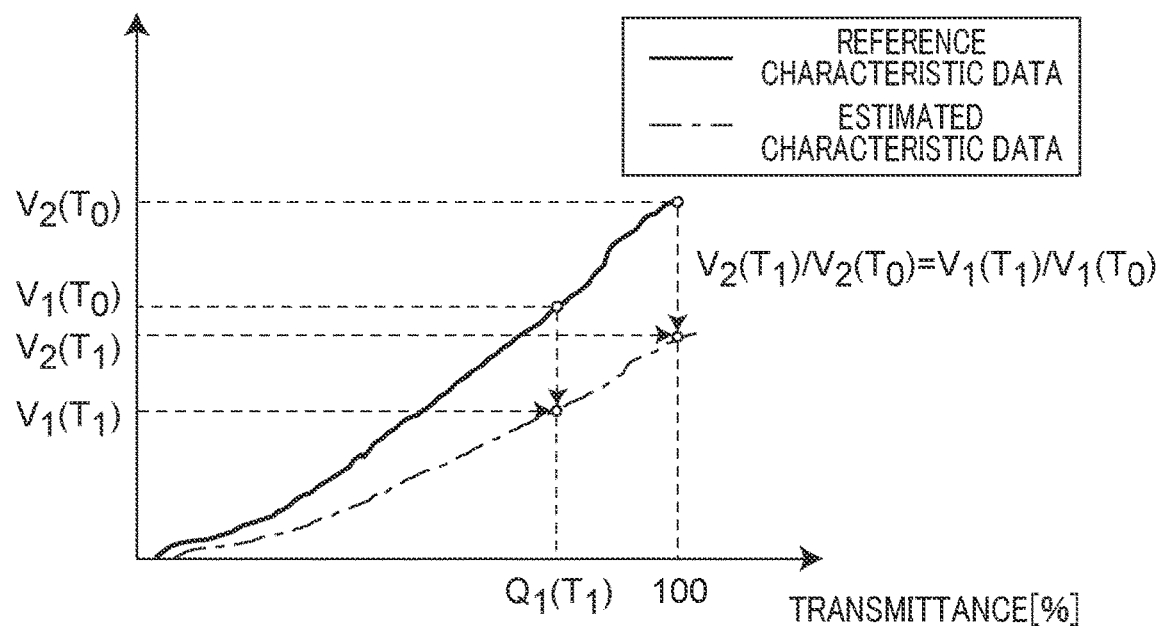
FIG. 9 is a schematic diagram for illustrating an example of calculation of liquid crystal transmittance using estimated characteristic data.

FIG. 9 is a schematic diagram for illustrating an example of calculation of liquid crystal transmittance using estimated characteristic data. As shown in FIG. 9, the transmittance calculator 50 calculates the estimated characteristic data indicating the relationship between the output voltage $V(T_1)$ and the transmittance at any temperature $T_1$ using the relationship of $V_2(T_1)/V_2(T_0)=V_1(T_1)/V_1(T_0)$.

Returning to FIG. 6, in step S4, the transmittance calculator 50 calculates the liquid crystal transmittance Q based on the first output value $V_1(T_1)$ and the estimated characteristic data at any temperature $T_1$.

As shown in FIG. 9, the transmittance calculator 50 calculates the transmittance $Q_1(T_1)$ of the first output value $V_1(T_1)$ at any temperature $T_1$ from the estimated characteristic data calculated in step S3. In this way, the transmittance calculator 50 changes the first output value based on the change in the second output value due to the temperature change, and calculates the liquid crystal transmittance Q of the liquid crystal panel 10 based on the changed first output value.

Effect

The dimming module 1 according to the first embodiment of the present disclosure includes a liquid crystal panel 10, a light emitting element 21, a first light receiving element 31, a second light receiving element 32, and a transmittance calculator 50. The liquid crystal panel 10 adjusts light transmittance. The light emitting element 21 applies detection light. The first light receiving element 31 receives the first detection light L1 transmitted through the liquid crystal panel 10 in the detection light, and outputs a first output value related to the light amount of the first detection light L1. The second light receiving element 32 receives the second detection light L2 not transmitted through the liquid crystal panel 10 in the detection light, and outputs a second output value related to the light amount of the second detection light L2. The transmittance calculator 50 changes the first output value based on the change in the second output value due to the temperature change, and calculates the liquid crystal transmittance Q of the liquid crystal panel 10 based on the changed first output value.

With this configuration, it is possible to calculate the liquid crystal transmittance Q of the liquid crystal panel 10 by correcting the change due to the temperature characteristic without using the temperature sensor. That is, according to the dimming module 1, the fluctuation of the output value of the light receiving element can be corrected even without using the temperature sensor, and the accurate liquid crystal transmittance Q can be calculated. In addition, since the temperature sensor may not be used, the number of components of the dimming module 1 can be reduced, the size thereof can be reduced, and the manufacturing cost thereof can be reduced.

In addition, the dimming module 1 according to the first embodiment further includes a clear panel 11 provided on the liquid crystal panel 10, and the second detection light L2 is light having been transmitted through the clear panel 11 in the detection light applied from the light emitting unit 20. With this configuration, the second detection light L2 is less likely to be dimmed, and the second detection light L2 from the light emitting element 21 can be accurately detected.

In addition, the first light receiving element 31 and the second light receiving element 32 respectively receive the first detection light L1 and the second detection light L2 at any temperature $T_1$. The transmittance calculator 50 acquires reference characteristic data indicating the relationship between the output value of the light receiving element and the transmittance at the reference temperature $T_0$. Based on the second output value $V_2(T_1)$ and the reference characteristic data at any temperature $T_1$, the transmittance calculator 50 calculates estimated characteristic data indicating the relationship between the output value of the light receiving element and the transmittance at any temperature $T_1$. The transmittance calculator 50 calculates the liquid crystal transmittance $Q_1(T_1)$ based on the first output value $V_1(T_1)$ and the estimated characteristic data at any temperature $T_1$. With this configuration, the estimated characteristic data can be calculated based on the second output value of the second light receiving element 32 and the reference characteristic data, and the liquid crystal transmittance $Q_1(T_1)$ of the liquid crystal panel 10 can be calculated based on the estimated characteristic data and the first output value $V_1(T_1)$ at any temperature $T_1$. Accordingly, the liquid crystal transmittance $Q_1(T_1)$ of the liquid crystal panel 10 can be accurately calculated even without using a temperature sensor.

In addition, the transmittance calculator 50 calculates a reference output value $V_2(T_0)$ indicating a transmittance of 100% in the reference characteristic data, calculates a ratio between the second output value $V_2(T_1)$ and the reference output value $V_2(T_0)$ at any temperature $T_1$, and calculates the estimated characteristic data based on the reference characteristic data and the ratio. With this configuration, the liquid crystal transmittance $Q_1(T_1)$ of the liquid crystal panel 10 can be calculated more accurately even without using a temperature sensor.

In addition, the detection light is visible light. Since the visible light has a large transmittance detection range, the transmittance can be detected more accurately.

In addition, the temperature characteristic of the first light receiving element 31 and the temperature characteristic of the second light receiving element 32 are substantially the same. With this configuration, the liquid crystal transmittance Q of the liquid crystal panel 10 can be calculated more accurately even without using a temperature sensor.

In addition, the imaging apparatus 100 including the dimming module 1 according to the first embodiment can also produce the same effect as the effect of the dimming module 1 described above.

It should be note that in the present embodiment, the light blocking member 40 and the dimming controller 51 are not essential components. The dimming module 1 does not need to include the light blocking member 40 and the dimming controller 51. For example, the dimming controller 51 may be included in a control apparatus different from the dimming module 1, and the dimming module 1 may transmit information on the first output value and the second output value of the first light receiving element 31 and the second light receiving element 32 to the control apparatus.

In the present embodiment, an example in which the first light receiving element 31 and the second light receiving element 32 are arranged on the first surface PS1 side of the liquid crystal panel 10 and the light emitting element 21 is arranged on the second surface PS2 side of the liquid crystal panel 10 has been described, but the present disclosure is not limited thereto. For example, the first light receiving element 31 and the second light receiving element 32 may be arranged on the second surface PS2 side of the liquid crystal panel 10, and the light emitting element 21 may be arranged on the first surface PS1 side of the liquid crystal panel 10.

In the present embodiment, an example in which the light blocking member 40 is disposed on the first surface PS1 side of the liquid crystal panel 10 has been described, but the present disclosure is not limited thereto. For example, the light blocking member 40 may be disposed on the second surface PS2 side of the liquid crystal panel 10.

In the present embodiment, an example in which the detection light is visible light has been described, but the present disclosure is not limited thereto. For example, the detection light may be infrared light, ultraviolet light, or the like.

In the present embodiment, an example in which the imaging apparatus 100 includes the controller 61 has been described, but the present disclosure is not limited thereto. The controller 61 is not an essential component. In this case, the controller 61 may be included in another control apparatus that controls the imaging apparatus 100.

In the present embodiment, an example in which the transmittance calculator 50, the dimming controller 51, and the controller 61 are separate elements has been described, but the present disclosure is not limited thereto. For example, one or more elements of the transmittance calculator 50, the dimming controller 51, and the controller 61 may be integrated or further divided.

Second Embodiment

A dimming module according to a second embodiment of the present disclosure will be described. It should be noted that in the second embodiment, the configurations identical or equivalent to those of the first embodiment will be denoted by the same reference numerals, and the description overlapping with the first embodiment will be omitted.

In the second embodiment, another example of the calculation processing of the liquid crystal transmittance in the dimming module 1 of the first embodiment will be described. The second embodiment is different from the first embodiment in calculating the liquid crystal transmittance without calculating the estimated characteristic data.

Figure 10:
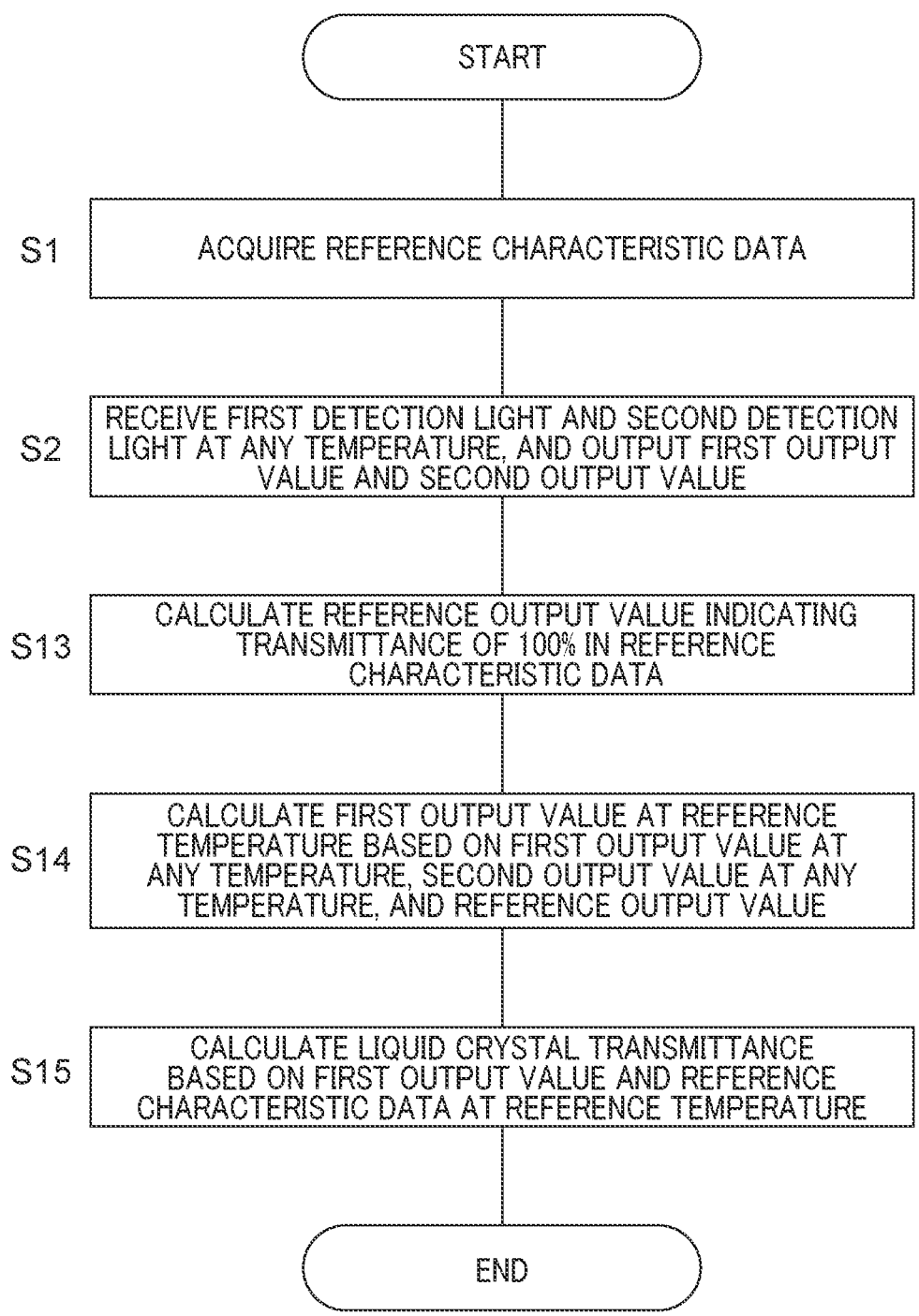
FIG. 10 is a flowchart of calculation of liquid crystal transmittance in a second embodiment of the present disclosure.
Figure 11:
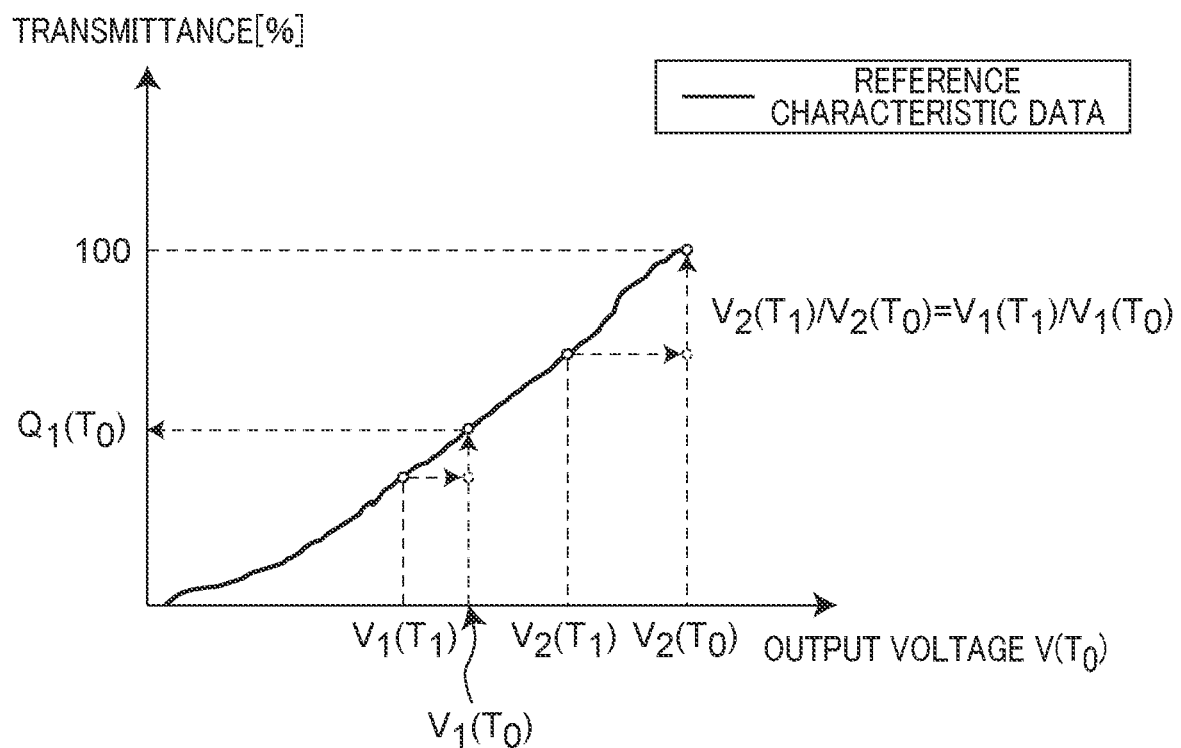
FIG. 11 is a schematic view for illustrating an example of calculation of liquid crystal transmittance in the second embodiment of the present disclosure.

FIG. 10 is a flowchart of calculation of liquid crystal transmittance in the second embodiment of the present disclosure. FIG. 11 is a schematic view for illustrating an example of calculation of liquid crystal transmittance in the second embodiment of the present disclosure.

As shown in FIG. 10, in step S1, the transmittance calculator 50 acquires reference characteristic data.

In step S2, the first light receiving element 31 and the second light receiving element 32 respectively receive the first detection light L1 and the second detection light L2 at any temperature $T_1$. Accordingly, the first light receiving element 31 outputs the first output value related to the light amount of the first detection light L1, and the second light receiving element 32 outputs the second output value related to the light amount of the second detection light L2.

In step S13, the transmittance calculator 50 calculates a reference output value indicating a transmittance of 100% in the reference characteristic data. In the present embodiment, the reference characteristic data is data indicating the relationship between the second output value $V_2(T_0)$ of the second light receiving element 32 and the transmittance at the reference temperature $T_0$. Therefore, the reference output value is the second output value $V_2(T_0)$ at which the transmittance is 100% at the reference temperature $T_0$.

In step S14, the transmittance calculator 50 calculates the first output value $V_1(T_0)$ at the reference temperature $T_0$ based on the first output value $V_1(T_1)$ at any temperature $T_1$, the second output value $V_2(T_1)$ at any temperature $T_1$, and the reference output value $V_2(T_0)$.

As has been described in the first embodiment, the first light receiving element 31 and the second light receiving element 32 have substantially the same temperature characteristic. Therefore, as shown in FIG. 11, the first output value of the first light receiving element 31 and the second output value of the second light receiving element 32 change at the same ratio with respect to the reference characteristic data. Specifically, the following relationship holds.

$$V_1(T_1)/V_1(T_0)=V_2(T_1)/V_2(T_0)$$

$V_1(T_0)$: first output value of first light receiving element 31 at reference temperature $T_0$ $V_1(T_1)$: first output value of first light receiving element 31 at any temperature $T_1$ $V_2(T_0)$: second output value (reference output value) of second light receiving element 32 at reference temperature $T_0$ $V_2(T_1)$: second output value of second light receiving element 32 at any temperature $T_1$ From the above relationship, the first output value $V_1(T_0)$ of the first light receiving element 31 at the reference temperature $T_0$ can be calculated by the following mathematical formula.

$$V_1(T_0)=V_1(T_1)\times[V_2(T_0)/V_2(T_1)]$$

As described above, the transmittance calculator 50 changes the first output value $V_1(T_1)$ of the first light receiving element 31 at any temperature $T_1$ to the first output value $V_1(T_0)$ of the first light receiving element 31 at the reference temperature $T_0$ based on the reference characteristic data and the second output value $V_2(T_1)$ of the second light receiving element 32 at any temperature $T_1$.

Returning to FIG. 10, in step S15, the transmittance calculator 50 calculates the liquid crystal transmittance $Q_1(T_0)$ based on the calculated first output value $V_1(T_0)$ and the reference characteristic data at the reference temperature $T_0$. Specifically, as shown in FIG. 11, the transmittance calculator 50 calculates the transmittance corresponding to the first output value $V_1(T_0)$ from the reference characteristic data.

Effect

In the dimming module 1 according to the second embodiment of the present disclosure, the first light receiving element 31 and the second light receiving element 32 respectively receive the first detection light L1 and the second detection light L2 at any temperature $T_1$. The transmittance calculator 50 acquires reference characteristic data indicating the relationship between the output value of the light receiving element and the transmittance at the reference temperature $T_0$, and calculates a reference output value $V_2(T_0)$ indicating a transmittance of 100% in the reference characteristic data. The transmittance calculator 50 calculates the first output value $V_1(T_0)$ at the reference temperature $T_0$ based on the first output value $V_1(T_1)$ at any temperature $T_1$, the second output value $V_2(T_1)$ at any temperature $T_1$, and the reference output value $V_2(T_0)$. The transmittance calculator 50 calculates the liquid crystal transmittance $Q_1(T_0)$ based on the first output value $V_1(T_0)$ and the reference characteristic data at the reference temperature $T_0$.

With this configuration, it is possible to calculate the liquid crystal transmittance $Q_1(T_0)$ of the liquid crystal panel 10 by correcting the change due to the temperature characteristic without using the temperature sensor. That is, according to the dimming module 1, the fluctuation of the output value of the light receiving element can be corrected even without using the temperature sensor, and the accurate liquid crystal transmittance $Q_1(T_0)$ can be calculated. In addition, since the temperature sensor may not be used, the number of components of the dimming module 1 can be reduced, the size thereof can be reduced, and the manufacturing cost thereof can be reduced. Furthermore, since it is possible to calculate the liquid crystal transmittance $Q_1(T_0)$ even without calculating the estimated characteristic data of the first embodiment, the arithmetic efficiency can be improved.

In addition, the imaging apparatus 100 including the dimming module 1 according to the second embodiment can also produce the same effect as the effect of the dimming module 1 described above.

Third Embodiment

A dimming module according to a third embodiment of the present disclosure will be described. It should be noted that in the third embodiment, the configurations identical or equivalent to those of the first embodiment will be denoted by the same reference numerals, and the description overlapping with the first embodiment will be omitted.

In the third embodiment, the dimming module 1 calculates the liquid crystal transmittance by canceling a decrease in output due to aged deterioration of the light emitting element 21 and the first and second light receiving elements 31 and 32.

It is conceivable that the light emitting element 21 and the first and second light receiving elements 31 and 32 decrease in the output due to aged deterioration. Since the second light receiving element 32 receives the second detection light L2 not transmitted through the liquid crystal panel 10, that is, the light having the liquid crystal transmittance of 100%, the second output value always outputs the output value having the liquid crystal transmittance of 100%. Therefore, the amount of decrease in output due to aged deterioration can be detected based on the decrease in the second output value. The transmittance calculator 50 cancels a decrease in output due to aged deterioration by changing the first output value of the first light receiving element 31 based on a change in the second output value of the second light receiving element 32. Accordingly, the liquid crystal transmittance Q can be calculated with higher accuracy.

[Example of Change of First Output Value]

Figure 12:
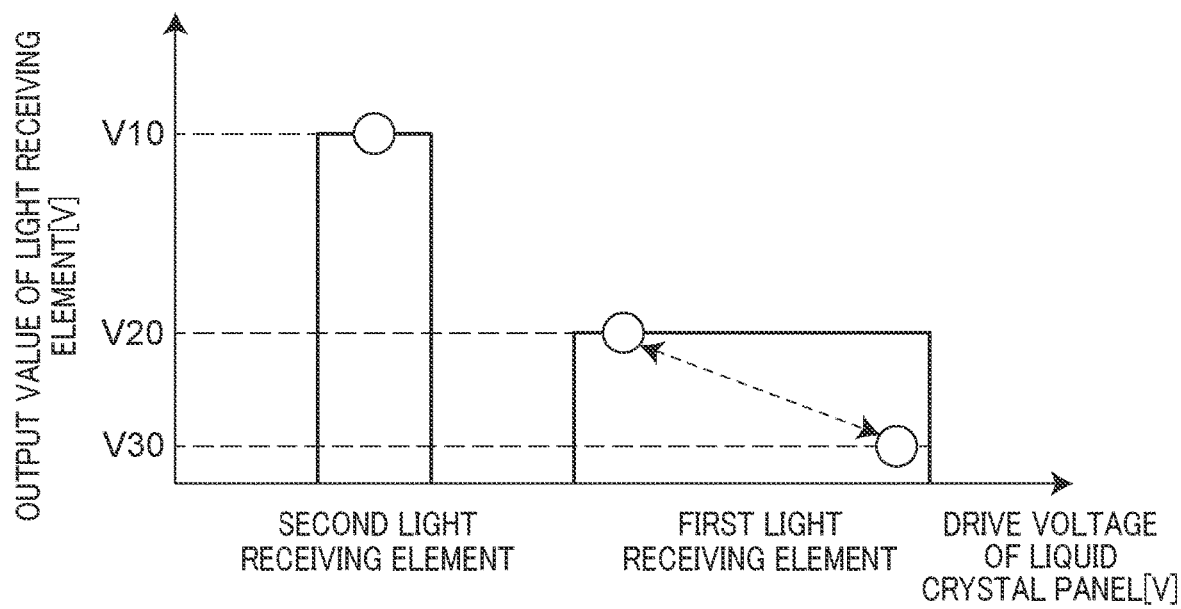
FIG. 12 is a schematic diagram for illustrating an example of an output value of a light receiving element in an initial characteristic.
Figure 13:
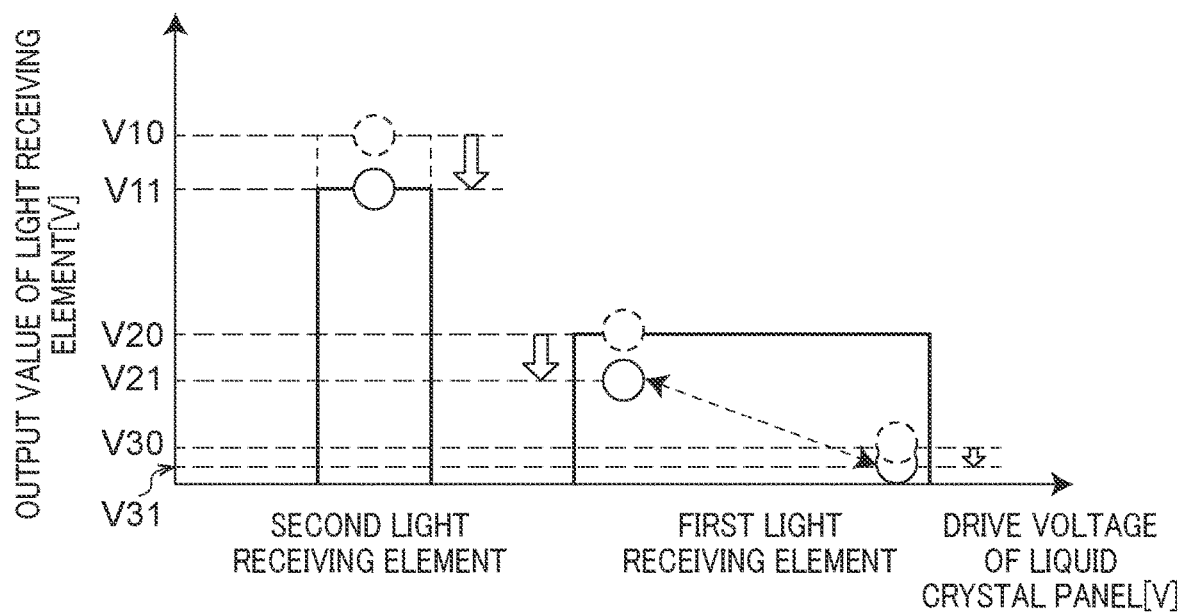
FIG. 13 is a schematic diagram for illustrating an example of an output value of a light receiving element after a temporal change.

An example of change processing of the first output value in the transmittance calculator 50 will be described with reference to FIGS. 12 and 13. FIG. 12 shows a schematic diagram for illustrating an example of the output value of the light receiving element in the initial characteristic, and FIG. 13 shows a schematic diagram for illustrating an example of the output value of the light receiving element after the change with time. It should be noted that FIG. 12 shows an initial characteristic, and FIG. 13 shows an example when the output of the light emitting element 21 decreases due to the change with time. The "initial characteristic" means a characteristic in a state where a temporal change of the light emitting element 21 does not occur. In addition, in the example shown in FIG. 12, V10>V20>V30, and in the example shown in FIG. 13, V10>V11, V20>V21, and V30>V31.

As shown in FIG. 12, in the initial characteristic, the second output value of the second light receiving element 32 is "V10", and the first output value of the first light receiving element 31 changes in the range of "V20" to "V30" according to the liquid crystal transmittance. It should be noted that "V20" is the maximum value of the first output value in the initial characteristic, and "V30" is the minimum value of the first output value in the initial characteristic.

As shown in FIG. 13, when the light emitting element 21 deteriorates due to a change with time, the second output value decreases to "V11", the maximum value of the first output value decreases to "V21", and the minimum value of the first output value decreases to "V31", as compared with the initial characteristics.

The transmittance calculator 50 changes the first output value based on a change from the initial characteristic of the second output value. In the present embodiment, the transmittance calculator 50 calculates the coefficient K based on the output value V10 of the initial characteristic and the output value V11 after the temporal change, in the second output value. For example, the coefficient K may be calculated by the following formula. It should be noted that the following formula is exemplary, and the calculation formula of the coefficient K is not limited thereto.

(Coefficient $K$)=(Output value $V10$ of initial characteristic)/(Output value $V11$ after temporal change)

The transmittance calculator 50 changes the first output value by multiplying the first output value by the calculated coefficient K.

For example, in the second output value, when the output value V10 of 1.0 V in the initial characteristic is changed to the output value V11 of 0.8 V after the change with time, the coefficient K is 1.0/0.8=1.25. In this case, also in the first output value, the output value decreases due to a change with time. For example, the maximum output value V20 of 0.25 V in the initial characteristics is changed to the maximum output value V21 of 0.2 V after the change with time. In addition, the minimum output value V30 of 0.0078 V in the initial characteristics is changed to the minimum output value V31 of 0.00624 V after the change with time. The transmittance calculator 50 changes the first output value by multiplying the first output value after the temporal change by the coefficient K=1.25. In this example, in the first output value after the change with time, the maximum output value V21 is changed to "0.2 V×1.25=0.25 V", and the minimum output value V31 is changed to "0.00624 V×1.25=0.0078 V".

As described above, the transmittance calculator 50 can detect a more accurate first output value and calculate the liquid crystal transmittance Q of the liquid crystal panel 10 by canceling the decrease in the output due to the temporal change of the light emitting element 21.

It should be noted that in the example of the change of the first output value described above, the change of canceling the output reduction due to the temporal change of the light emitting element 21 has been described, but the change of the first output value described above can also be applied to the output reduction due to the temporal change of the first and second light receiving elements 31 and 32. Since the first and second light receiving elements 31 and 32 have substantially the same characteristics, their aged deteriorations are substantially the same or different within a predetermined range. Therefore, by changing the first output value described above, it is possible to cancel also the output reduction due to aged deterioration of the first and second light receiving elements 31 and 32. In addition, the change of the first output value described above may also be applied to the change in the characteristic accompanying the environmental change of the dimming module 1. For example, the above processing may be applied when the characteristic of the light emitting element 21 changes due to a temperature environment change. It should be noted that the change of the first output value described above is an example, and the change processing in the transmittance calculator 50 is not limited thereto.

It should be noted that in the present embodiment, in combination with the first or second embodiment or the second embodiment, the liquid crystal transmittance Q of the liquid crystal panel 10 may be calculated. In this case, the transmittance calculator 50 changes the first output value based on the change in the output value due to the temperature change and the temporal change in the second output value, and calculates the liquid crystal transmittance based on the changed first output value. Specifically, after the second output value is multiplied by the coefficient K for aged deterioration described in the present embodiment, the change calculation has only to be performed on the temperature change described in the first embodiment or the second embodiment.

Effect

In the dimming module 1 according to the third embodiment of the present disclosure, the transmittance calculator 50 calculates the liquid crystal transmittance Q of the liquid crystal panel 10 based on the first output value of the first light receiving element 31 and the second output value of the second light receiving element 32. Specifically, the transmittance calculator 50 changes the first output value based on a change in the second output value due to a temporal change. With this configuration, it is possible to calculate the liquid crystal transmittance Q of the liquid crystal panel 10 with high accuracy by canceling the output reduction due to the temporal change of the light emitting element 21 and the first and second light receiving elements 31 and 32.

For example, the transmittance calculator 50 calculates the liquid crystal transmittance Q using "(coefficient K)= (output value of initial characteristic)/(output value after temporal change)". With this configuration, the liquid crystal transmittance Q of the liquid crystal panel 10 can be calculated with higher accuracy.

In addition, the imaging apparatus 100 including the dimming module 1 according to the third embodiment can also produce the same effect as the effect of the dimming module 1 described above.

Hereinafter, modifications of the dimming module 1 of the first to third embodiments of the present disclosure will be described.

First Modification

Figure 14:
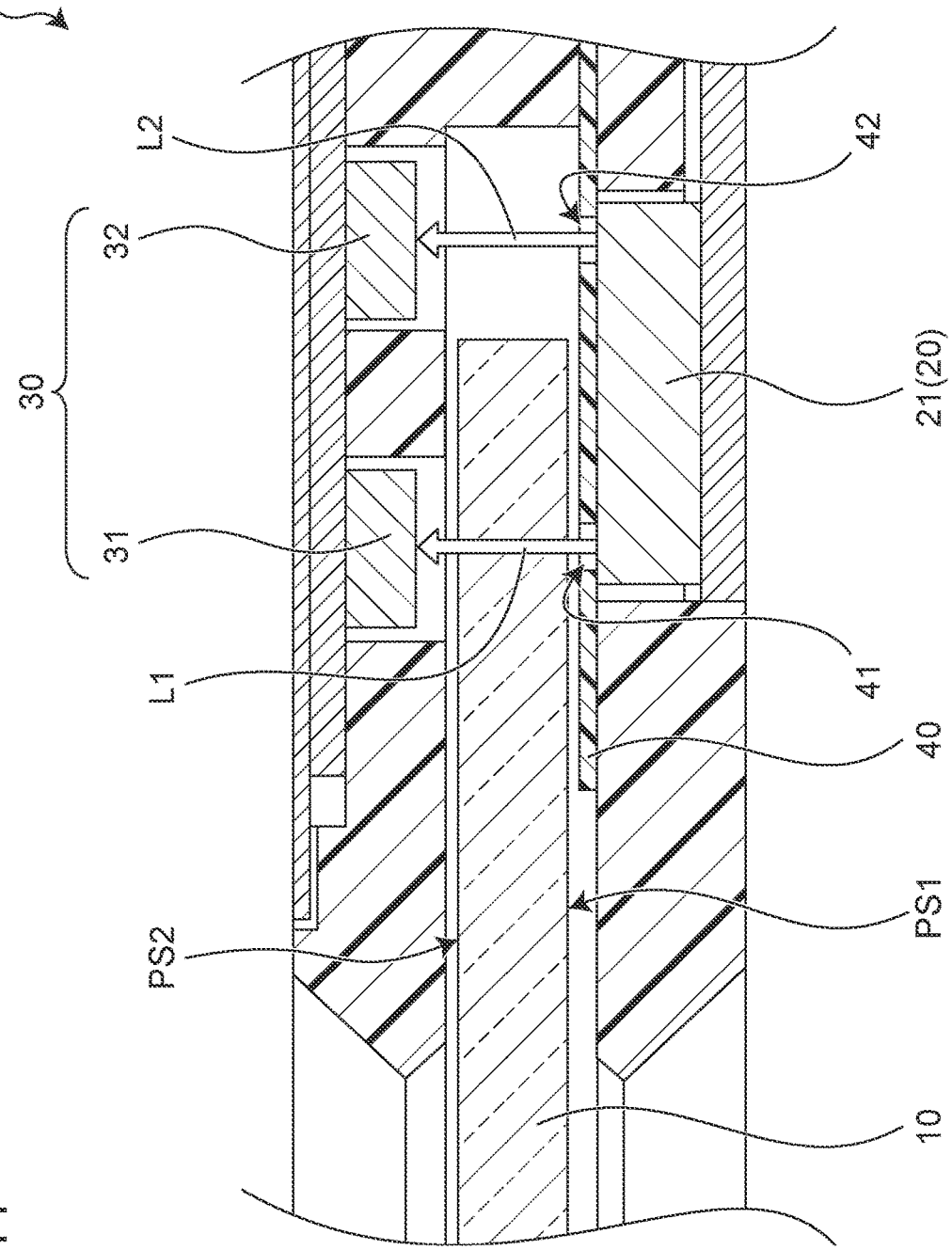
FIG. 14 is a schematic cross-sectional view of a dimming module of a first modification.

FIG. 14 is a schematic cross-sectional view of a dimming module of a first modification. As shown in FIG. 14, in the dimming module 1A, the liquid crystal panel 10 does not need to be provided with a clear panel 11. In the dimming module 1A, the second detection light L2 applied from the light emitting element 21 of the light emitting unit 20 may be applied to the second light receiving element 32 as it is. Even in this configuration, the second detection light L2 is less likely to be dimmed, and the second detection light L2 from the light emitting element 21 can be accurately detected.

It should be noted that in the first modification, an example in which the liquid crystal panel 10 is not provided with the clear panel 11 has been described, but the present disclosure is not limited thereto. In the first modification, the liquid crystal panel 10 may be provided with the clear panel 11. In this case, the second detection light L2 is incident on the second light receiving element 32 without being transmitted through the clear panel 11.

Second Modification

Figure 15:
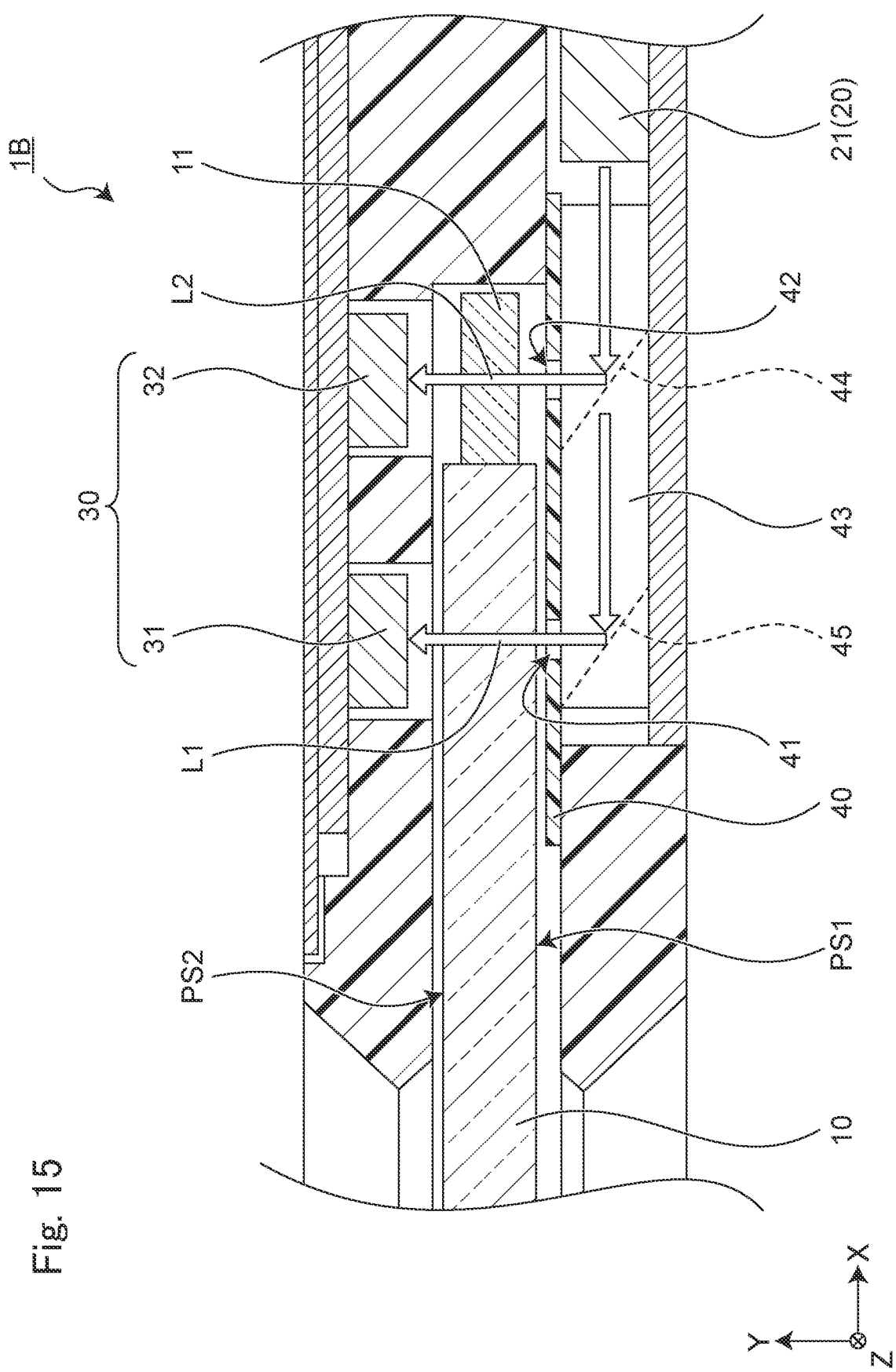
FIG. 15 is a schematic cross-sectional view of a dimming module of a second modification.

FIG. 15 is a schematic cross-sectional view of a dimming module of a second modification. As shown in FIG. 15, the dimming module 1B includes a prism 43 that divides the detection light applied from the light emitting element 21 into the first detection light L1 and the second detection light L2. The prism 43 is disposed on the first surface PS1 side of the liquid crystal panel 10. The prism 43 has diffraction surfaces 44 and 45, and the diffraction surface 44 divides the detection light applied from the light emitting unit 20 into the first detection light L1 and the second detection light L2, and refracts the second detection light L2 toward the clear panel 11 and the second light receiving element 32. The diffraction surface 45 refracts the first detection light L1 divided by the diffraction surface 44 toward the liquid crystal panel 10 and the first light receiving element 31. With this configuration, the degree of freedom of the arrangement position of the light emitting unit 20 is improved. For example, the light emitting unit 20 may be disposed on the first surface PS1 side of the liquid crystal panel 10.

It should be noted that in the second modification, an example in which the prism 43 has the diffraction surfaces 44 and 45 has been described, but the present disclosure is not limited thereto. The structure of the prism 43 may be appropriately changed according to the configuration and arrangement of the light emitting unit 20.

The foregoing is merely specific embodiments of the present disclosure, and the protection scope of the present disclosure is not limited thereto. The present disclosure includes, in the drawings and the above-described specific embodiments, the above-described content, but the present disclosure is not limited to the content. The disclosed various embodiments or examples may be combined without departing from the scope or spirit of the present disclosure.

The invention claimed is:

1. An imaging apparatus comprising:
   a liquid crystal panel configured to adjust light transmittance;
   a light emitting element configured to apply detection light;
   a first light receiving element configured to receive first detection light transmitted through the liquid crystal panel in the detection light, and to output a first output value related to a light amount of the first detection light;
   a second light receiving element configured to receive second detection light not transmitted through the liquid crystal panel in the detection light, and to output a second output value related to a light amount of the second detection light;
   a transmittance calculator configured to calculate a liquid crystal transmittance of the liquid crystal panel based on the first output value and the second output value; and
   an imaging element configured to image imaging light transmitted through the liquid crystal panel.

2. The imaging apparatus according to claim 1, wherein the transmittance calculator changes the first output value based on a change in the second output value, and calculates the liquid crystal transmittance based on the changed first output value.

3. The imaging apparatus according to claim 2, wherein the change in the second output value includes a change in an output value due to a temperature change.

4. The imaging apparatus according to claim 3, wherein the first light receiving element and the second light receiving element respectively receive the first detection light and the second detection light at any temperature, and
   the transmittance calculator
   acquires reference characteristic data indicating a relationship between an output value of a light receiving element and transmittance at a reference temperature, calculates estimated characteristic data indicating a relationship between an output value of a light receiving element and transmittance at the any temperature based on the second output value at the any temperature and the reference characteristic data, and calculates the liquid crystal transmittance based on the first output value and the estimated characteristic data at the any temperature.

5. The imaging apparatus according to claim 4, wherein the transmittance calculator calculates a reference output value indicating a transmittance of 100% in the reference characteristic data, calculates a ratio between the second output value and the reference output value at the any temperature, and converts the reference characteristic data into the estimated characteristic data using the ratio.

6. The imaging apparatus according to claim 3, wherein the first light receiving element and the second light receiving element respectively receive the first detection light and the second detection light at any temperature, and the transmittance calculator acquires reference characteristic data indicating a relationship between an output value of a light receiving element and transmittance at a reference temperature, calculates a reference output value indicating a transmittance of 100% in the reference characteristic data, calculates the first output value at the reference temperature based on the first output value at the any temperature, the second output value at the any temperature, and the reference output value, and calculates the liquid crystal transmittance based on the first output value at the reference temperature and the reference characteristic data.

7. The imaging apparatus according to claim 3, wherein a temperature characteristic of the first light receiving element and a temperature characteristic of the second light receiving element are substantially the same.

8. The imaging apparatus according to claim 2, wherein the change in the second output value includes a change in an output value due to a temporal change.

9. The imaging apparatus according to claim 8, wherein the transmittance calculator calculates the liquid crystal transmittance using a coefficient K calculated by the second output value, and the coefficient K is represented by a following formula:

(coefficient $K$)=(output value of initial characteristic)/(output value after temporal change).

10. The imaging apparatus according to claim 2, wherein the change in the second output value includes a change in an output value due to a temperature change and a temporal change.

11. The imaging apparatus according to claim 1, further comprising a clear panel provided on the liquid crystal panel, wherein the second detection light is light having been transmitted through the clear panel in the detection light.

12. The imaging apparatus according to claim 1, further comprising a dimming controller configured to control transmittance of the liquid crystal panel based on the liquid crystal transmittance calculated by the transmittance calculator.

* * * * *